US008469639B2

(12) United States Patent
Nedzlek

(10) Patent No.: US 8,469,639 B2
(45) Date of Patent: Jun. 25, 2013

(54) ACTUATED MATERIAL REMOVAL TOOL

(75) Inventor: Kevin Nedzlek, Howell, MI (US)

(73) Assignee: Valenite, LLC, Madison Heights, MI (US)

( * ) Notice: Subject to any disclaimer, the term of this patent is extended or adjusted under 35 U.S.C. 154(b) by 1316 days.

(21) Appl. No.: 12/127,482

(22) Filed: May 27, 2008

(65) Prior Publication Data

US 2008/0298914 A1  Dec. 4, 2008

Related U.S. Application Data

(60) Provisional application No. 60/924,785, filed on May 31, 2007, provisional application No. 61/006,547, filed on Jan. 18, 2008.

(51) Int. Cl.
*B23B 35/00* (2006.01)
*B23B 29/034* (2006.01)

(52) U.S. Cl.
USPC ............... 408/1 R; 82/1.4; 408/156; 408/158

(58) Field of Classification Search
USPC ................. 408/156–163, 153, 1 R; 82/1.11, 82/1.2, 1.4, 1.5
IPC ............................................ B23B 29/02,29/034
See application file for complete search history.

(56) References Cited

U.S. PATENT DOCUMENTS

| | | | |
|---|---|---|---|
| 2,398,362 A * | 4/1946 | Dare | 408/161 |
| 3,405,049 A | 10/1968 | Czubak | |
| 3,530,745 A | 9/1970 | Milewski | |
| 3,625,625 A * | 12/1971 | Van Roojen et al. | 408/158 |
| 3,918,826 A * | 11/1975 | Friedline | 408/154 |
| 4,105,360 A * | 8/1978 | Keller | 408/118 |
| 4,416,569 A * | 11/1983 | Yamakage et al. | 408/4 |
| 4,547,100 A | 10/1985 | Naccarato et al. | |
| 4,654,957 A | 4/1987 | Powell et al. | |

(Continued)

FOREIGN PATENT DOCUMENTS

| | | |
|---|---|---|
| DE | 3332243 A * | 3/1985 |
| DE | 40 22 579 A1 | 1/1991 |

(Continued)

OTHER PUBLICATIONS

Supplementary European Search Report for 08754769.1, dated May 30, 2011.

(Continued)

*Primary Examiner* — Daniel Howell
(74) *Attorney, Agent, or Firm* — Morgan, Lewis & Bockius LLP

(57) ABSTRACT

Material removal tool with a translating bar having an actuation surface shaped as a cone or frustum, wherein an axial position of the cone or frustum along a length of the translating bar corresponds to a position of a push rod in operable contact with a first flexibly mounted cartridge on which a cutting insert is mounted is disclosed. The translating bar is actuated between a first and second position to place different combinations of flexibly mounted cutting inserts and fixedly mounted cutting inserts in a radially outermost position. The material removal tool optionally includes a support for the translating bar to reduce radial variation during machining operations. Various combinations of flexibly mounted cutting inserts and fixedly mounted cutting inserts are disclosed along with various methods for removing material using the disclosed material removal tool.

41 Claims, 11 Drawing Sheets

U.S. PATENT DOCUMENTS

| | | | |
|---|---|---|---|
| 4,867,619 A * | 9/1989 | Briggs | 408/158 |
| 4,927,301 A | 5/1990 | Reiterman | |
| 4,941,782 A | 7/1990 | Cook | |
| 5,316,417 A | 5/1994 | Romi | |
| 5,427,480 A * | 6/1995 | Stephens | 408/168 |
| 6,012,880 A * | 1/2000 | Horn et al. | 408/156 |
| 6,013,016 A | 1/2000 | Irvine et al. | |
| 6,394,710 B1 | 5/2002 | Kurz | |
| 6,402,440 B2 | 6/2002 | Soma | |
| 6,536,997 B1 | 3/2003 | Kress | |
| 6,846,136 B2 | 1/2005 | Brock et al. | |
| 7,195,430 B2 * | 3/2007 | Giorda | 408/156 |
| 2001/0039861 A1 | 11/2001 | Ostertag | |
| 2010/0014933 A1 | 1/2010 | Nedzlek | |

FOREIGN PATENT DOCUMENTS

| | | | |
|---|---|---|---|
| DE | 19613897 A1 * | 5/1997 | |
| DE | 10 2004 052211 A1 | 4/2006 | |
| DE | 10 2005 028366 A1 | 12/2006 | |
| EP | 1 123 766 | 8/2001 | |
| EP | 1 153 683 A1 | 11/2001 | |
| GB | 1 309 181 | 3/1973 | |
| JP | 62-201231 | 12/1987 | |
| JP | 62-295211 | 12/1987 | |
| JP | 1-101708 | 7/1989 | |
| JP | H08-118143 A | 5/1996 | |
| JP | 2001-129707 A | 5/2001 | |
| JP | 2002-307216 A | 10/2002 | |
| JP | 2005246527 A * | 9/2005 | |
| JP | 2006321040 A * | 11/2006 | |
| JP | 4083242 B2 | 4/2008 | |

OTHER PUBLICATIONS

Extended European Search Report dated Mar. 23, 2011 from corresponding European Application No. 08779929.2 (6 pages).

Japanese Office Action and English translation mailed on Jan. 15, 2013, issued in corresponding Japanese Patent Application No. 2010-514863.

Japanese Office Action and English translation mailed on Feb. 5, 2013, issued in corresponding Japanese Patent Application No. 2010-510325.

* cited by examiner

Fig. 3A(iii)

Fig. 3A(ii)

ACTUATED MATERIAL REMOVAL TOOL

CROSS-REFERENCE TO RELATED APPLICATIONS

This application claims priority under 35 U.S.C. §119(e) to U.S. Provisional Application Ser. No. 60/924,785 filed on May 31, 2007, entitled "ACTUATED MATERIAL REMOVAL TOOL" and to U.S. Provisional Application Ser. No. 61/006,547, filed on Jan. 18, 2008, entitled "ACTUATED MATERIAL REMOVAL TOOL," the entire contents of each of these applications are incorporated herein by reference.

FIELD

The present disclosure relates to cutting tools of the type having at least one cutting element the position of which relative to the tool is adjustable. More particularly, the present disclosure is related to a material removal tool with a translating bar that is actuated to change the position of at least one cutting element relative to the tool.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Known rotatable tools comprising position adjustable cutting elements use various means for effecting changes of position of the cutting elements, including mechanical actuators, hydraulics and pneumatic pressure. Typically, the actuation device, such as a translating bar internal to the rotatable tool, was precisely fitted and had high friction surfaces, requiring high mechanically-generated or fluid-generated forces for actuation movement. Examples of known rotatable tools with position adjustable cutting elements are EP Patent Application No. 1123766, Japanese Utility Model Application No. 62-201231 and U.S. Pat. Nos. 4,941,782, 6,394,710 and 6,846,136.

SUMMARY

An exemplary embodiment of a material removal tool comprises a housing body including a connector at a mating end, a piston head in an actuating chamber internal to the housing body, a translating bar including an actuation surface, and a first flexibly mounted cartridge on an active portion of the material removal tool, the first flexibly mounted cartridge including at least one seating pocket for a cutting insert, wherein the translating bar includes a first end operably connected to the piston head to axially translate between a first position and a second position when the piston head translates, wherein in the first position, the active portion has a first active volume and a radially outermost surface of a cutting insert seated in the seating pocket on the first flexibly mounted cartridge is radially inward from the first active volume, wherein in the second position, the radially outermost surface of the cutting insert seated in the pocket on the first flexibly mounted cartridge is radially outward from the first active volume, and wherein the actuation surface includes a cone or frustum, wherein an axial position of the cone or frustum along a length of the translating bar corresponds to a position of a push rod in operable contact with the first flexibly mounted cartridge.

An exemplary method for removing material from a workpiece with a rotating material removal tool to form a bore comprises translating the rotating material removal tool in a first direction while contacting the workpiece with a first fixedly mounted cutting insert, wherein a diameter at an outermost surface of the first fixedly mounted cutting insert defines a first active volume, actuating the material removal tool to move a portion of a second cutting insert mounted in a seating pocket of a first flexibly mounted cartridge of the material removal tool radially outward of the first active volume, and translating the rotating material removal tool in a second direction while contacting the workpiece with the second cutting insert, wherein actuating the material removal tool axially translates a translating bar from a first position to a second position, wherein the translating bar includes an actuation surface, and wherein the actuation surface includes a cone or frustum, wherein an axial position of the cone or frustum along a length of the translating bar corresponds to a position of a push rod in operable contact with the first flexibly mounted cartridge.

An exemplary method for removing material from a workpiece with a rotating material removal tool to form a bore comprises actuating the material removal tool to move a portion of a first flexibly mounted cutting insert of a first flexibly mounted cartridge of the material removal tool radially outward of an active volume of the material removal tool, translating the rotating material removal tool in a first direction while contacting the workpiece with the first flexibly mounted cutting insert and while contacting the workpiece with a first fixedly mounted cutting insert of the material removal tool, wherein the first fixedly mounted cutting insert is positioned axially forward in the first direction from the first flexibly mounted cutting insert and wherein a diameter at an outermost surface of the first fixedly mounted cutting insert defines the first active volume, actuating the material removal tool to move the first flexibly mounted cutting insert radially inward from the first active volume, and translating the rotating material removal tool in a second direction, wherein actuating the material removal tool axially translates a translating bar from a first position to a second position, wherein the translating bar includes an actuation surface, and wherein the actuation surface includes a cone or frustum, wherein an axial position of the cone or frustum along a length of the translating bar corresponds to a position of a push rod in operable contact with the first flexibly mounted cartridge.

An exemplary method for removing material from a workpiece with a rotating material removal tool to form a bore comprises translating the rotating material removal tool in a first direction while contacting the workpiece with a first fixedly mounted cutting insert of the material removal tool, wherein a diameter at an outermost surface of the first fixedly mounted cutting insert defines a first active volume, translating the rotating material removal tool in a second direction, actuating the material removal tool to move a portion of a first flexibly mounted cutting insert of a flexibly mounted cartridge radially outward of the first active volume, translating the rotating material removal tool in the first direction while contacting the workpiece with the first flexibly mounted cutting insert, actuating the material removal tool to move the first flexibly mounted cutting insert radially inward of the first active volume, and translating the rotating material removal tool in the second direction, wherein actuating the material removal tool axially translates a translating bar from a first position to a second position, wherein the translating bar includes an actuation surface, and wherein the actuation surface includes a cone or frustum, wherein an axial position of the cone or frustum along a length of the translating bar corresponds to a position of a push rod in operable contact with the first flexibly mounted cartridge.

An exemplary method for removing material from a workpiece with a rotating material removal tool to form a bore comprises actuating the material removal tool to move a portion of a first flexibly mounted cutting insert of a first flexibly mounted cartridge radially outward of a first flexibly mounted cutting insert of a second flexibly mounted cartridge, translating the rotating material removal tool in a first direction while contacting the workpiece with the first fixedly mounted cutting insert, actuating the material removal tool to move a portion of the second flexibly mounted cutting insert of the second flexibly mounted cartridge radially outward of the first flexibly mounted cutting insert of the first flexibly mounted cartridge, and translating the rotating material removal tool in a second direction, wherein actuating the material removal tool axially translates a translating bar from a first position to a second position, wherein the translating bar includes an actuation surface, and wherein the actuation surface includes a cone or frustum, wherein an axial position of the cone or frustum along a length of the translating bar corresponds to a position of a push rod in operable contact with the first flexibly mounted cartridge.

An exemplary method to reduce variation in radial position of an inner diameter surface of a bore formed with a material removal tool, the material removal tool including a translating bar including an actuation surface, and a first flexibly mounted cartridge on an active portion of the material removal tool, the first flexibly mounted cartridge including at least one seating pocket for a cutting insert, wherein the translating bar axially translates between a first position and a second position, wherein in the first position, the active portion has a first active volume and a radially outermost surface of a cutting insert seated in the seating pocket on the first flexibly mounted cartridge is radially inward from the first active volume, wherein in the second position, the radially outermost surface of the cutting insert seated in the pocket on the first flexibly mounted cartridge is radially outward from the first active volume, and wherein the actuation surface includes a cone or frustum, wherein an axial position of the cone or frustum along a length of the translating bar corresponds to a position of a push rod in operable contact with the first flexibly mounted cartridge, comprises positioning a support structure at a second end of the translating bar.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which.

DETAILED DESCRIPTION

Figure 1:
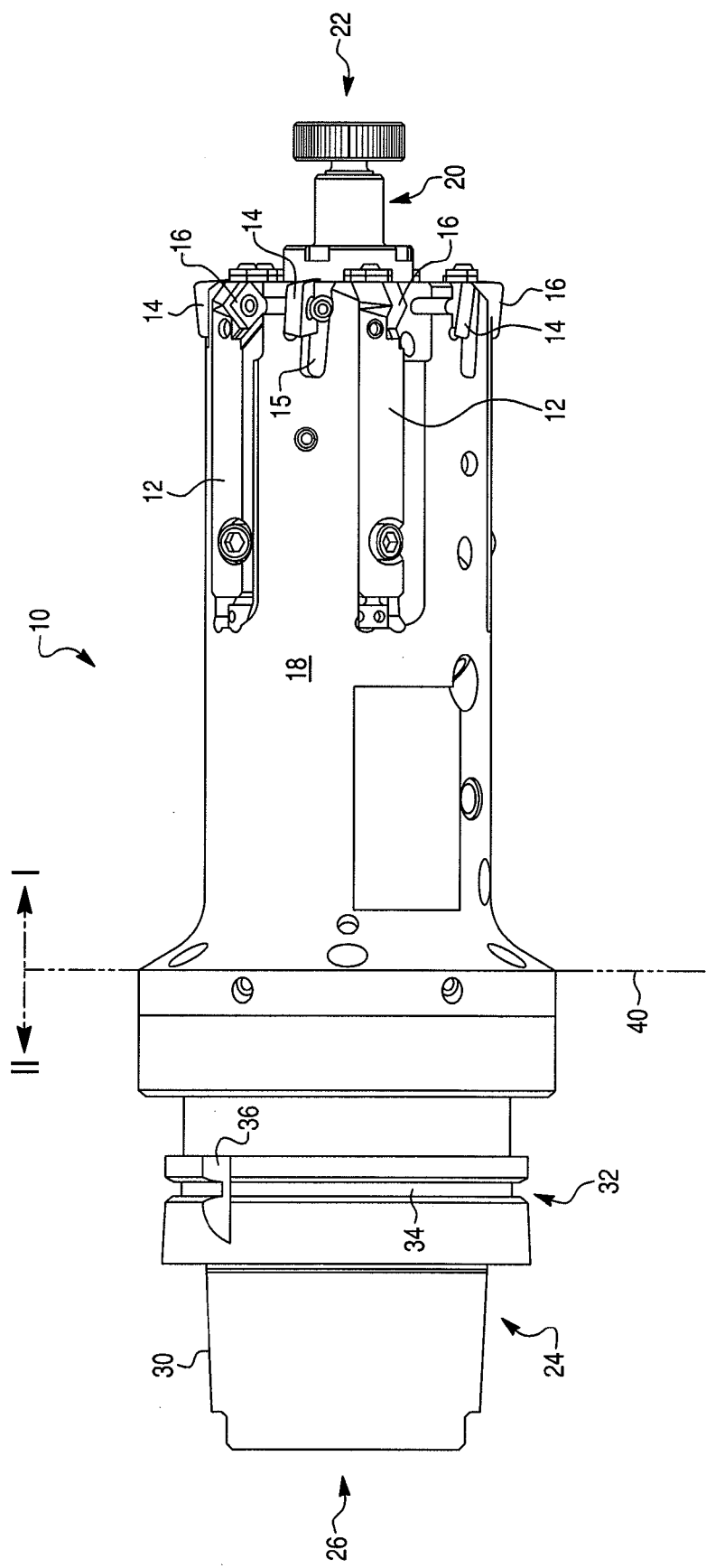
FIG. 1 is a schematic drawing of an exemplary embodiment of a material removal tool.

FIG. 1 is a schematic drawing of an exemplary embodiment of a material removal tool 10. In FIG. 1, the exterior of the material removal tool 10 is shown in a side elevation. The material removal tool 10 includes a plurality of flexibly mounted cartridges 12 with flexibly mounted cutting inserts 16 and a plurality of fixedly mounted inserts 14, where the fixedly mounted cutting inserts 14 are fixedly mounted directly to a seating surface of a pocket 15 formed in a housing body 18 of the material removal tool. Alternatively, the fixedly mounted inserts 14 can be seated in a pocket on a fixedly mounted cartridge. Each of the flexibly mounted cartridges 12 and, where present, the fixedly mounted cartridges includes at least one pocket with a seating surface for receiving a cutting insert. Suitable cutting inserts can be of any type, e.g., milling, turning, boring. One exemplary embodiment of suitable cutting inserts is the side locking insert disclosed in U.S. application Ser. No. 11/409,089, entitled "Side Locking Insert and Material Removal Tool with Same," filed Apr. 24, 2006, the entire contents of which are incorporated herein by reference.

Other features of the material removal tool 10 visible in FIG. 1 include a delimiting structure, such as an adjustment assembly 20, at a first end 22 and a connector 24 at a second end 26. When mounted on a machine tool, the first end 22 is a distal end relative to the machine tool and the second end 26 is a mating end for attachment to the machine tool. Other features include various openings, connectors and manipulators for assembly and operation of the material removal tool 10.

The connector 24 at the second end 26 of the material removal tool 10 attaches to a machine tool, such as a HAAS VF6 milling machine, for operation. The connector 24 can take any suitable form that allows attachment to a desired machine tool. In an exemplary embodiment, the connector 24 has a tapered surface 30, for example, tapered rearward or toward the proximal end 26. A transition piece 32 can optionally be included with the connector 24. An example of a transition piece 32 includes at least one feature for mating to an operating machine or to a storage system. For example, the transition piece 32 can include a circumferential groove 34. The circumferential groove 34, or similar structure, can provide an attachment point for mating the material removal tool 10 to a carousel storage system used in machining operations to store multiple material removal tools. In another example, the transition piece 32 can include a key slot 36. The key slot 36, or similar structure, can provide an orientation or a mating with a corresponding feature on the machine tool when the material removal tool is mounted for use.

Figure 2:
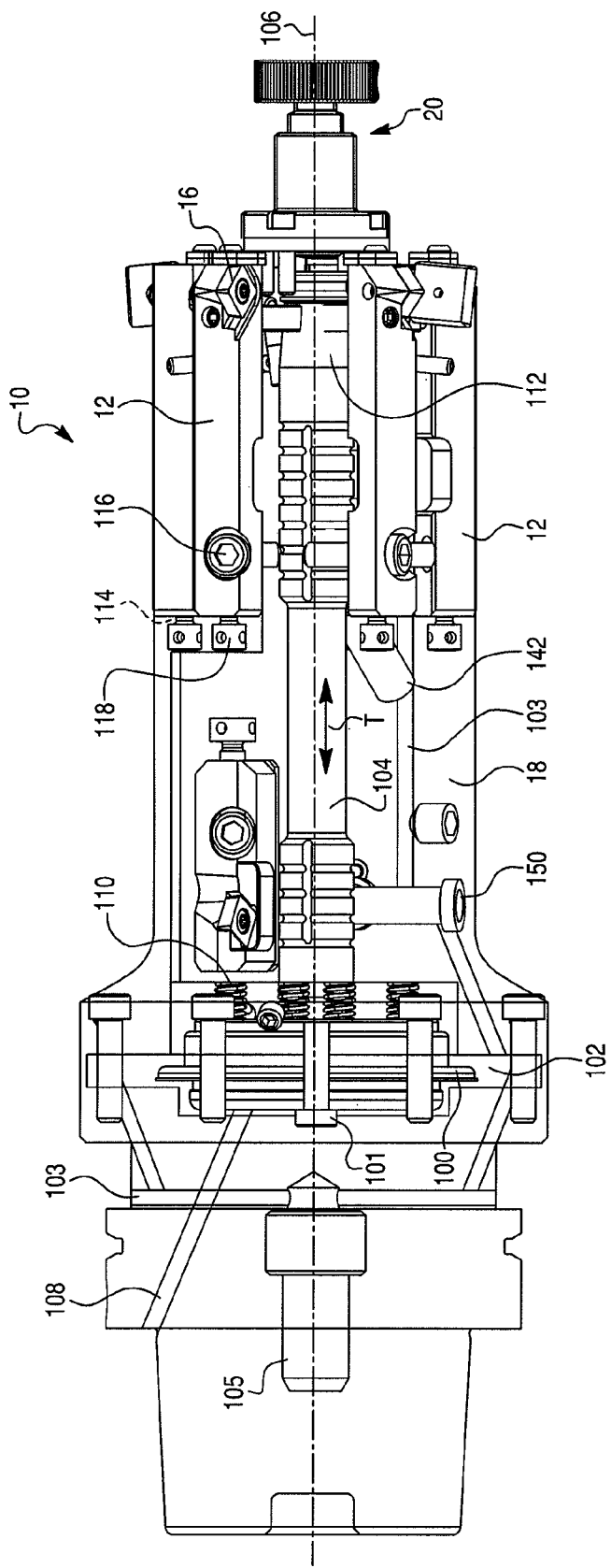
FIG. 2 is a schematic drawing of an exemplary embodiment of a material removal tool.

FIG. 2 is a schematic drawing of an exemplary embodiment of a material removal tool 10. In FIG. 2, the exterior of the material removal tool 10 is shown in a side elevation wherein the housing body 18 is in shadow to allow viewing of interior features. The material removal tool 10 includes a piston head 100 in an actuating chamber 102 internal to the housing body 18. A translating bar 104 includes a first end operably connected to the piston head 100 to axially translate (T) along a first axis 106 between a first position and a second position when the piston head 100 translates. The translating bar can be connected to the piston head by any suitable means, such as, for example, the guide pin 101 shown in FIG. 2. The piston head 100 translates by an actuating fluid. Actuating fluid is supplied above the piston head 100 via a passage 108. The actuating fluid can be a liquid or a gas.

At pressure, the actuating fluid above the piston head 100 overcomes the biasing force of biasing elements 110. Examples of biasing elements include mechanical systems, such as springs, dashpots, pistons and bellows, elastic materials, and non-mechanical systems, such as compressible fluids and compressible gases. Biasing can be accomplished by any desired technique. For example, a mechanical biasing element, such as the spring shown in FIG. 2, can be used. In exemplary embodiments, the biasing element is preloaded to exert a force to bias the piston head toward the proximal end 26 of the material removal tool 10, although the opposite arrangement can also be constructed. Also shown in FIG. 2 is the internal cooling passages 103, which are supplied and vented through spindle 105.

The translating bar 104 includes an actuating surface 112 at a second end. In exemplary embodiments, the actuating surface 112 has an outer surface having the shape of a cone or frustum. The actuating surface 112 is formed of a hard, wear resistant material, such as cemented carbide. In exemplary embodiments, the cone or frustum is brazed onto the translating bar, although any suitable attachment means can be used. The actuating surface can be polished to a desired smoothness. A suitable smoothness for the actuating surface is about (i.e., ±10%) 4 RMS.

Also shown in FIG. 2 are the flexibly mounted cutting inserts 16 and the fixedly mounted inserts 14. In the exemplary embodiment shown, flexibly mounted cutting inserts 16 are mounted in seating surfaces of pockets in the flexibly mounted cartridges 12 and fixedly mounted inserts 14 are fixedly mounted directly to seating surfaces of pockets in the housing body 18. All or a portion of the fixedly mounted cutting inserts 14 can be fixedly mounted directly to seating surfaces formed in the housing body 18. The flexibly mounted cartridges 12 sit in a slot 114 and have one or more cutting inserts mounted thereon. Cutting surfaces of the cutting inserts regardless of whether flexibly or fixedly mounted, project radially relative to the first axis 106 of the material removal tool 10, although the extent to which each type of cutting insert projects below or beyond the volume of the housing body 18 can be different, as discussed further herein.

Figure 3A:
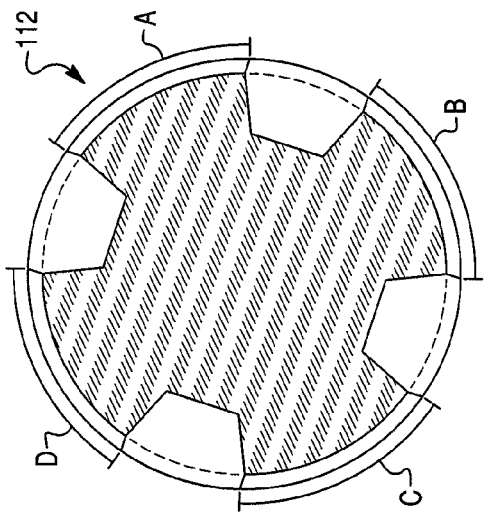
FIGS. 3A and 3B are schematic drawings showing, in more detail, exemplary embodiments of the actuating surface and the flexibly mounted cartridges.
Figure 3A:
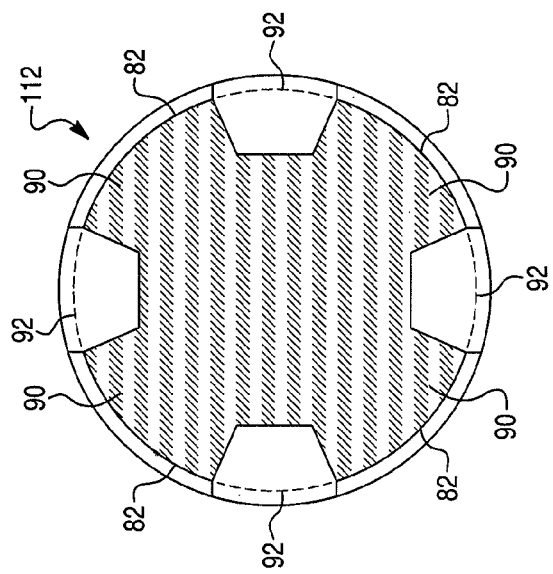
Figure 3A:
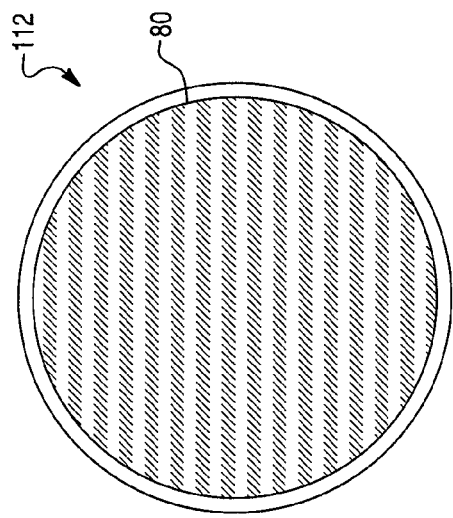
Figure 3B:
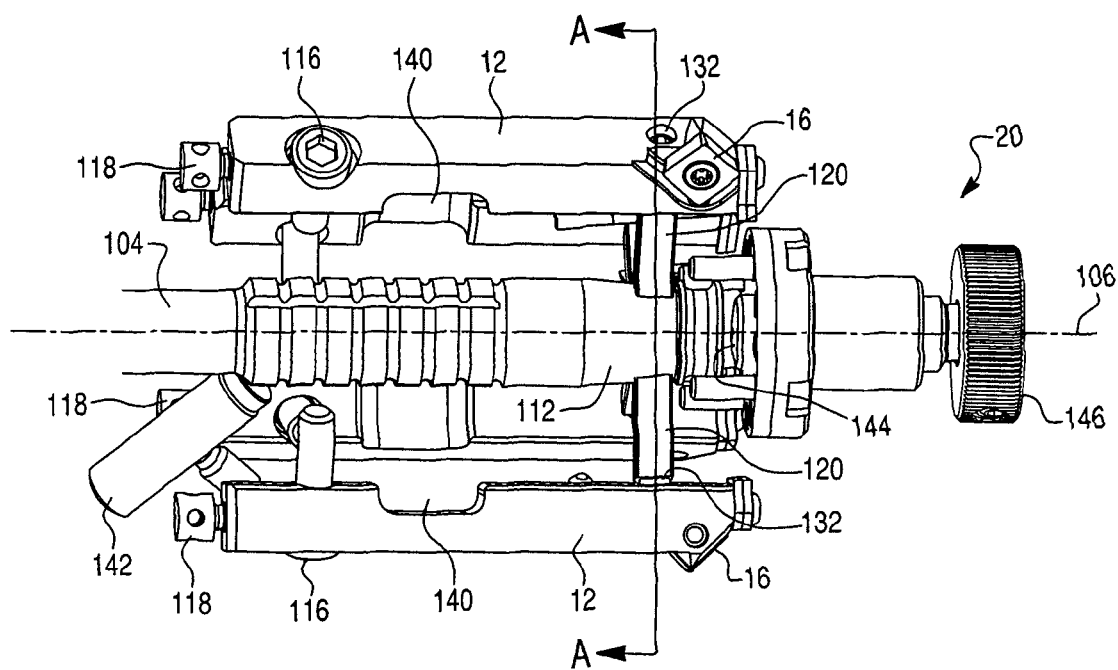

FIGS. 3A and 3B are schematic drawings showing, in more detail, exemplary embodiments of the actuating surface 112 and the flexibly mounted cartridges 12.

Turning to the actuating surface 112, an exemplary embodiment is shown with a peripheral surface 80 that is continuous, i.e., there is at least one radial cross-section of the actuating surface 112 that is continuous and has no breaks. FIG. 3A shows such a continuous peripheral surface 80 in cross-section at (i). In another exemplary embodiments, the peripheral surface 82 is non-continuous. When the peripheral surface is non-continuous, the actuating surface 112 includes separated structures 90, but the separated structures 90 are located on the periphery or on the projection 92 of the periphery having the generally shape of a cone or frustum. In some aspects the number of separated structures 90 are the same as the number of independently actuated flexibly mounted cartridges. FIG. 3A shows a non-continuous peripheral surface 82 in cross-section at (ii). In an additional exemplary embodiment, the actuating surface 112 is a combination of a continuous peripheral surface 80 in cross-section at some axial positions along first axis 106 and a non-continuous peripheral surface 82 in cross-section at other axial positions along first axis 106. Where a continuous peripheral surface is present, an outer surface of the cone or frustum has a peripheral extent, i.e., sum total of occupied periphery, of 360°, as viewed in radial cross-section. Where a non-continuous peripheral surface is present, an outer surface of the cone or frustum has a peripheral extent, i.e., sum total of occupied periphery, of from about 120° to less than 360°, alternatively from about 270° to less than 360°, alternatively from about 120° to about 300°, alternatively from about 120° to about 180°, alternatively from about 150° to about 180°, alternatively from about 150° to about 300°, as viewed in radial cross-section. As an example of the peripheral extent or a non-continuous surface, FIG. 3A shows and labels a peripheral extent at (iii), where the peripheral extent is the angular sum of peripheral portions A, B, C and D, i.e., A+B+C+D=peripheral extent.

Turning to the flexibly mounted cartridges 12 such as exemplary illustrated in FIG. 3B, the flexibly mounted cartridges 12 are secured to the housing body (not shown) at a first end by any suitable mounting mechanism 116, such as fastener, a cap screw, a bolt or a screw. FIGS. 2 and 3 depict the mounting mechanism 116 as a cap screw. Further, the cartridge can optionally include an axial locating device, such as a locating screw 118, which can be adjusted to change an axial position of the cartridge in the slot 114.

At the second end of the flexibly mounted cartridge 12, the flexibly mounted cartridge 12 is contacted by or is operatively contacted by a push rod 120 or a push rod 120 is mounted to the cartridge 12. Although the term rod is used, the push rod can take any geometric shape, such as, for example, curved geometric shapes, and regular and irregular polygonal shapes. As shown in radial cross-section (Section A-A from FIG. 3B) in FIG. 4A, the push rods 120 are translatable (t) radially relative to the actuating surface 112 along a second axis 122. A face 124 of the first end 126 of the push rod 120 contacts the actuating surface 112 in a line contact. A face 128 of the second end 130 of the push rod 120 contacts the cartridge 112 directly or operatively contacts the cartridge 12 through, for example, contact pin 132. An axial position of the actuating surface 112 along an axial length of the translating bar 104 corresponds to a position of the push rod 120 in operable contact with the flexibly mounted cartridge 12.

Figure 4A:
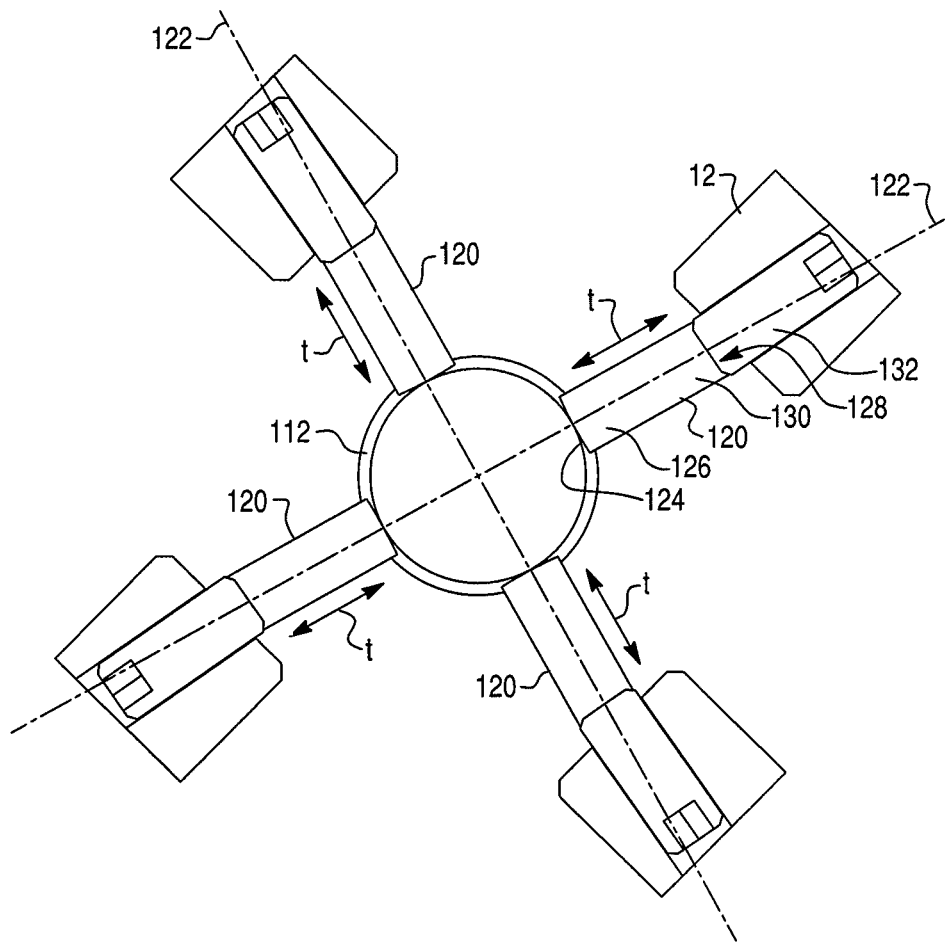
FIG. 4A shows the radial cross-section A-A from FIG. 3B.
Figure 4B:
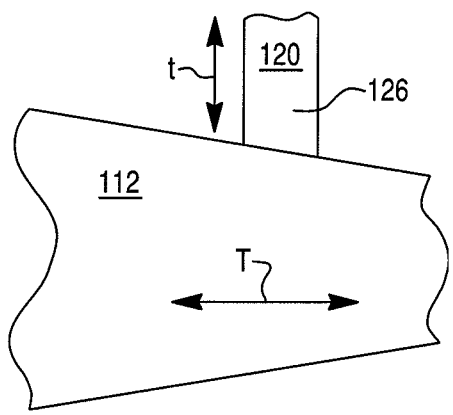
FIG. 4B shows the first end of the push rod in a side elevation view

In the FIG. 4B view, the first end 126 of the push rod 120 is shown in a side elevation view. The face 124 of the first end 126 of the push rod 120 has a tapered surface and the contact between the tapered surface of the push rod 120 and the complementary surface on the actuating surface 112 are more clearly shown.

For example, the face 124 of the first end 126 of the push rod 120 has an angled surface that correlates to the conical or frustum shape of the actuating surface 112. As the translating bar 104 translates (T), the face 124 maintains line contact (when viewed in radial cross-section) with an axially extending length of the actuating surface 112 and the push rod 120 translates (t). The second end 130 of the push rod 120 operatively contacts the cartridge 12, either directly or through an intermediate structure, such as contact pin 132 shown in FIG. 4A.

Figure 5A:
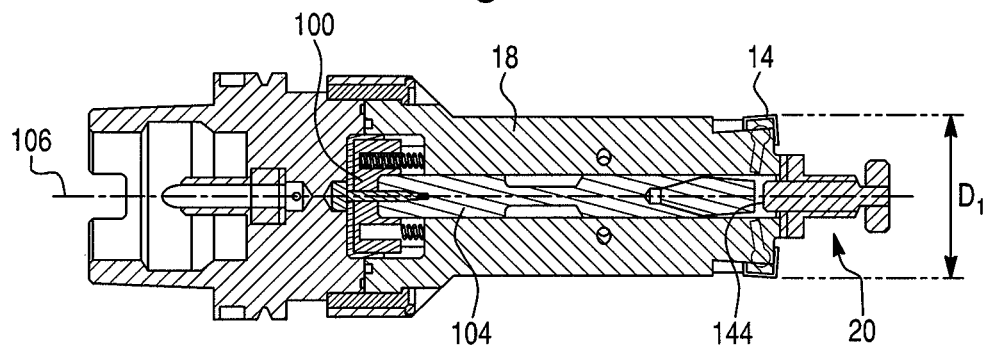
FIGS. 5A and 5B schematically illustrate the translating bar in the first position.
Figure 5B:
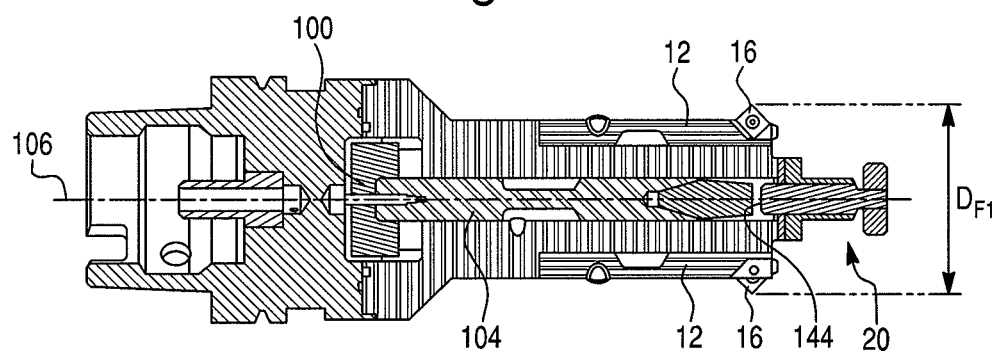
Figure 6:
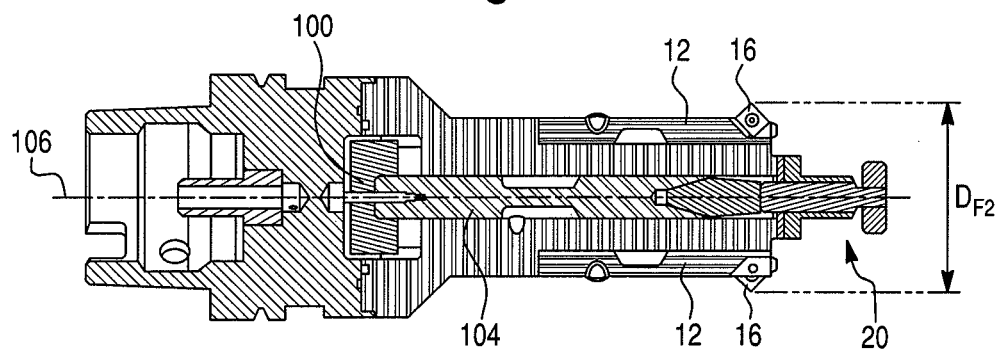
FIG. 6 schematically illustrates the translating bar in the second position.
Figure 7:
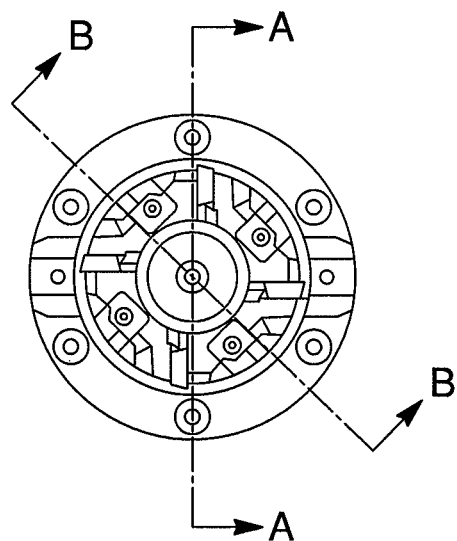
FIG. 7 shows, for reference, the locations of the cross-sectional views of the material removal tool illustrated in FIGS. 5A, 5B and 6.

As previously noted herein, the translating bar 104 includes a first end operably connected to the piston head 100 to axially translate (T) along a first axis 106 between a first position and a second position when the piston head 100 translates. FIGS. 5A and 5B and FIG. 6 schematically illustrate the translating bar in the first position (FIGS. 5A and 5B) and the second position (FIG. 6) in an exemplary embodiment of a material removal tool. FIG. 7 shows, for reference, the locations of the cross-sectional views of the exemplary embodiment of the material removal tool illustrated in FIGS. 5A, 5B and 6. FIG. 5A is section A-A and FIGS. 5B and 6 are section B-B.

In the first position shown in FIGS. 5A and 5B, the positions of the flexibly mounted cartridges and the positions of the fixedly mounted cutting inserts, whether mounted via fixed cartridges or directly mounted, are shown. In the FIG. 5A exemplary embodiment, fixedly mounted cutting inserts 14 directly mounted to the housing body 18 are illustrated. The fixedly mounted cutting inserts 14 have an outermost radial extent that is represented by diameter $D_1$. The radial outermost extent of the cutting insert is typically a cutting surface or cutting edge of the cutting insert. In the FIG. 5B exemplary embodiment, flexibly mounted cutting inserts 16 mounted on the flexibly mounted cartridges 12 are illustrated.

With the translating bar 104 in the first position, the inserts 16 on the flexibly mounted cartridges 12 are in a radially retracted position (relative to their position when the translating bar is in the second position). In the radially retracted position, the inserts 16 on the flexibly mounted cartridge 12 have an outermost radial extent that is illustrated by diameter $D_{F1}$. Diameter $D_1$ is larger than the diameter of the housing body 18 itself and diameter $D_1$ is larger than diameter $D_{F1}$ so that when rotating for material removal operations, the fixedly mounted cutting inserts 14 at diameter $D_1$ can remove material without the flexibly mounted cutting inserts 16 at diameter $D_{F1}$ contacting the workpiece. Diameter $D_{F1}$ can be any value less than diameter $D_1$ including being greater than the diameter of housing body 18, the same as the diameter of the housing body 18 or less than the diameter of the housing body 18 or, optionally, combinations thereof, i.e., inserts on different flexibly mounted cartridges can optionally have different diameters $D_{F1}$.

FIG. 6 illustrates the positions of the flexibly mounted cartridges 16 when the translating bar 104 is in the second position. With the translating bar 104 in the second position, the inserts 16 on the flexibly mounted cartridges 12 are in a radially extended position (relative to their position when the translating bar is in the first position). In the radially extended position, the inserts 16 on the flexibly mounted cartridge 12 have an outermost radial extent that is illustrated by diameter $D_{F2}$. Diameter $D_{F2}$ is larger than diameter $D_1$ so that when rotating for material removal operations, the inserts 16 at diameter $D_{F2}$ can remove material without the inserts 14 at diameter $D_1$ contacting the workpiece. Diameter $D_{F2}$ can be any value greater than diameter $D_1$. Optionally, inserts on different flexibly mounted cartridges can have different diameters $D_{F2}$.

Also illustrated in FIGS. 5A, 5B and 6 are the relative positions of the translating bar 104 associated with the first position and the second position. In the first position, translating bar 104 is in contact with a first delimiting structure, such as, for example, return stop 142 illustrated in FIG. 3, and is spaced apart from a second delimiting structure, such as the adjustment assembly 20. In the second position, translating bar 104 is spaced apart from the first delimiting structure and is in contact with the second delimiting structure, such as, for example, contact surface 144 of the adjustment assembly 20. The contact surface 144 of the adjustment assembly 20 can be moved by adjusting the adjustment assembly 20. For example, turning of knurled knob 146 moves the contact surface 144 along the first axis 106 and changes the distance of translational travel (T) of the translating bar 104. In the exemplary embodiment show, the return stop 142 and the adjustment assembly 20 limit the range of translational travel (T) of the translating bar 104, but any first and second delimiting structures can be used. Further, both first and second delimiting structures can be adjustable, both can be fixed or one can be adjustable and one fixed. Although described herein as a return stop, the first delimiting structure can be any suitable structure. Similarly, although described herein as an adjustment assembly, the second delimiting structure can be any suitable structure. Further, in the absence of a return stop and/or an adjustment assembly and/or other suitable features, the internal walls of actuating chamber in which the piston moves can act as one or both of the first delimiting structure and/or the second delimiting structure to limit axial movement of the translation bar 104.

Translating the translating bar 104 between the first position and the second position changes which set of cutting inserts are extended the furthest in the radial direction. In the first position, a radially outermost surface of a cutting insert seated in the pocket on the flexibly mounted cartridge is radially inward from a radially outermost surface of a cutting insert seated in the pocket on the fixed mounted cartridge or fixedly mounted. Therefore, only the cutting insert seated in the pocket on the fixedly mounted cartridge or directly mounted contacts the workpiece and removes material during operation. In the second position, a radially outermost surface of a cutting insert seated in the pocket on the flexibly mounted cartridge is radially outward from a radially outermost surface of a cutting insert seated in the pocket on the fixedly mounted cartridge or directly mounted. Therefore, only the cutting insert seated in the pocket on the flexibly mounted cartridge contacts the workpiece and removes material during operation. In this way, different types of inserts can be used by the material removal tool based on the state of actuation of the translating bar. In one example, the cutting inserts seated in the pocket on the fixedly mounted cartridge or directly mounted are semi-finish inserts and the cutting inserts seated in the pocket on the flexibly mounted cartridge are finish inserts.

It should be understood that the embodiment shown and described in connection with FIGS. 5A, 5B, 6 and 7 is merely one example of a material removal tool embodying the principles discloses herein. Other combinations of (a) flexibly mounted cartridges with cutting inserts, (b) fixedly mounted cartridges with cutting inserts and (c) fixed cutting inserts can be used. Further, the flexibly mounted cartridges with cutting inserts, fixedly mounted cartridges with cutting inserts and fixed cutting inserts do not all have to be of the same type nor do all of the cutting inserts on any of (a), (b) and (c) have to be operative to remove material at the same time. Another exemplary embodiment has cutting inserts only on a flexibly mounted cartridges or only one set of cutting inserts on one set of flexibly mounted cartridges.

In some exemplary embodiments, the material removal tool can be generally described as having an active portion and a mounting portion. Referring again to the exemplary embodiment of FIG. 1, the active portion I is separated from the mounting portion II at a transition line 40. The transition line 40 can be coincident with the transition piece 32 or, as shown, can be at a different location of the material removal tool 10. During operation, the active portion I is placed near or, for example during boring, inserted into the volume of the workpiece and the mounting portion II generally does not get operatively positioned within the volume of the workpiece. Thus, only locations and features on the active portion I are available for material removal operations. In the exemplary embodiment of FIG. 1, the active portion I has a generally regular shape and has a different diameter than that of the mounting portion II. For an active portion I that has a regular shape, such as a cylinder, the diameter at any point of the active portion I is substantially constant along its axial length and an active volume of the material removal tool 10 can be defined as the volume occupied by the rotating material removal tool based on that diameter of the active portion I. For irregularly shaped active portions, an active volume can be defined as the volume occupied by the rotating material removal tool based on the largest diameter at any point of the active portion. When the active portion of the material removal tool has cutting inserts and are the radially outermost surface along the active portion, then the diameter at the outermost surface of the cutting inserts is used to determine the active volume.

In view of the above discussion of active volume, one can appreciate that the different combinations of (a) flexibly mounted cartridges with cutting inserts, (b) fixedly mounted cartridges with cutting inserts and (c) fixed cutting inserts which can be used with the material removal tool calls for a determination of active volume for each combination.

For example, where the material removal tool includes a first flexibly mounted cartridge on an active portion of the material removal tool, the first flexibly mounted cartridge including at least one seating pocket for a cutting insert, and at least one fixed mounting location for a fixedly mounted cutting insert, a first active volume is determined based on a radially outermost surface of the fixedly mounted cutting insert when the translation bar is in the first position. A second active volume can be determined based on a radially outermost surface of the flexibly mounted cutting insert when the translation bar is in the second position. In this example, the first flexibly mounted cartridge is retracted when the translating bar is in the first position and is extended (or flexed) when the translating bar is in the second position. The at least one fixed mounting location can be a seating surface on a fixedly mounted cartridge or can be a seating surface directly on the housing body, or when more then one fixed mounting location, both a seating surface on a fixedly mounted cartridge and a seating surface directly on the housing body can be used.

In another example, where the material removal tool includes a first flexibly mounted cartridge on an active portion of the material removal tool, the first flexibly mounted cartridge including at least one seating pocket for a cutting insert, and a second flexibly mounted cartridge on the active portion of the material removal tool, the second flexibly mounted cartridge including at least one seating pocket for a second cutting insert, the first active volume is determined based on a radially outermost surface of the second cutting insert seated on the second flexibly mounted cartridge when the translating bar is in the first position. A second active volume can be determined based on a radially outermost surface of the first flexibly mounted cutting insert when the translation bar is in the second position. In this example, the first flexibly mounted cartridge is retracted when the translating bar is in the first position and is extended (or flexed) when the translating bar is in the second position and the second flexibly mounted cartridge is retracted when the translating bar is in the second position and is extended (or flexed) when the translating bar is in the first position.

In exemplary embodiments, the flexibly mounted cartridge 12 can be mounted to obtain a desired flexing of the cartridge 12 under actuation of the translating bar 104. For example, in some embodiments, the cartridge can include a flex slot 140 shown in FIG. 3. The flex slot 140 is on a surface of the cartridge 12 facing toward a surface of the slot 114. When the flex slot 140 separates the mounting mechanism 116, such as the cap screw, from the point of contact or point of operative contact of the second end of the push rod 120 with the cartridge 12 and the insert, then the cartridge flexes radially more easily at the end with the insert.

The position of the insert relative to the flex slot, the mounting mechanism, and the point of contact or point of operative contact of the second end of the push rod provides an additional variable that can be adjusted by a tool designer to influence the adjustability of the insert. For example, if the insert is axially located between the axial position of the cap screw and the axial position of the push rod, then the insert will translate a radial distance that is less than the translated distance of the push rod. Such a translation can be determined and considered. An example is an axial position of the insert that is at a distance from the axial position of the cap screw that is 75% of the separation distance from the axial position of the cap screw to the axial position of the push rod.

As previously discussed, the return force of the cartridge arising from the flexing of the cartridge exerts a reverse force through the push rod on the actuating surface. This reverse force provides a radial biasing force to center the translating bar, guide the translating bar and/or pilot the translating bar. The radial biasing forces contribute to a repeatability of actuation of about (±10%) 1µm. In other words, repeated actuation of the material removal tool moves the flexibly mounted cartridge radially outward a distance that is repeated on subsequent actuations to within about (±10%) 1µm of the desired travel distance.

Figure 8:
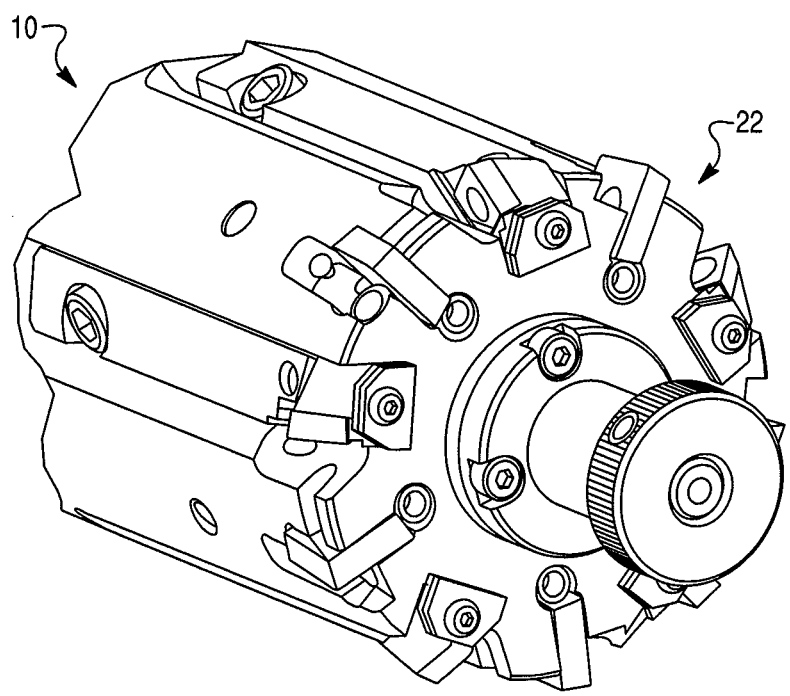
FIG. 8 shows a first end of another exemplary embodiment of a material removal tool with five flexibly mounted cartridges and five directly mounted inserts.

FIGS. 3 and 4A show the material removal tool with four flexibly mounted cartridges. However, any number of flexibly mounted cartridges can be used, for example, 2 or more, 3 or more, 5 or more, 6 or more, 7 or more, and so forth. Also, FIGS. 3 and 4A show the material removal tool with the flexibly mounted cartridges distributed radially about the translating bar with equal radial spacing, where the spacing is based, for example, on the number of flexibly mounted cartridges. For example, for four cartridges each cartridge is separated by 90° (i.e., 360°/4). However, equal radial spacing is not required as long as the reverse force providing a radial biasing force to the translating bar is radially balanced. As an alternative example for four cartridges, flexibly mounted cartridges can be located at the following radial positions: 30°, 150°, 210° and 330°. FIG. 8 shows a first end 22 of another exemplary embodiment of a material removal tool 10 with five flexibly mounted cartridges and five directly mounted inserts.

Referring again to FIG. 2, several features are shown that limit the movement of the translating bar 104. For example, first delimiting structure, such as, for example, return stop 142, is shown. Also for example, second delimiting structure, such as, for example, adjustment assembly 20, is shown. In another example, rotational key 150 in an axial slot on the translating bar 104, is shown. Rotational key 150 allows translational motion (T) of the translating bar 104 along first axis 106, but limits or prevents rotational movement of the translating bar 104 about first axis 106. The rotational key 150 is optional.

Figure 9:
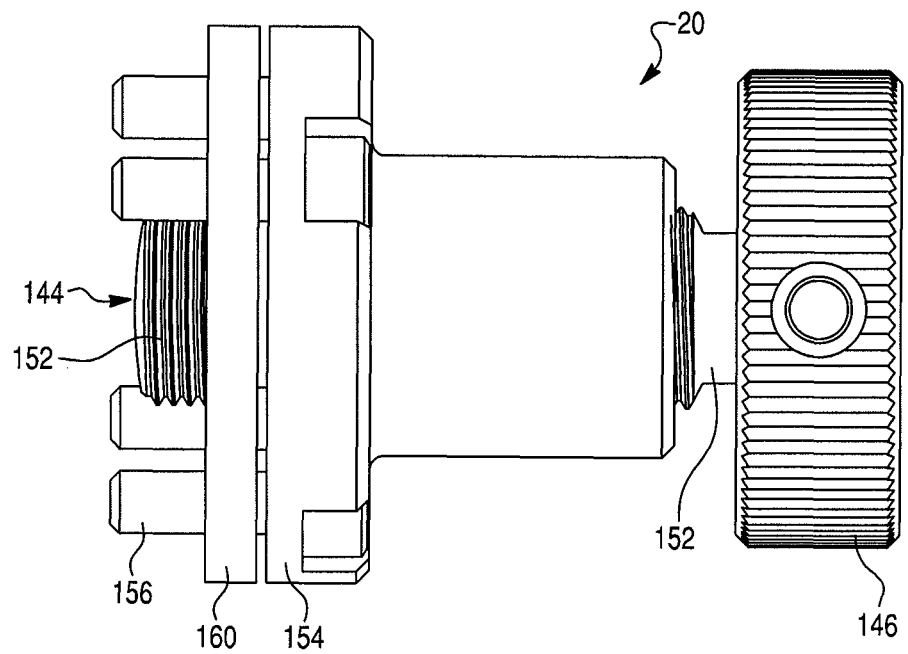
FIGS. 9 and 10 illustrate an exemplary embodiment of adjustment assembly.
Figure 10:
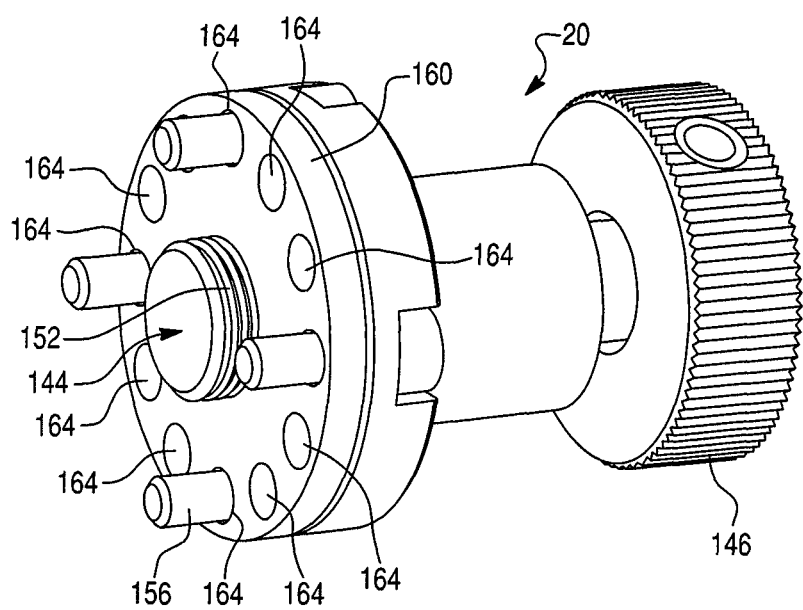

FIGS. 9 and 10 illustrate an exemplary embodiment of adjustment assembly 20. The adjustment assembly 20 includes a knurled knob 146 or other suitable manipulating point that, by its manipulation, moves the contact face 144 that produces the positive stop action of the second delimiting structure. A threaded connection 152 runs between the knurled knob 146 and the contact face 144. Note the contact face can be incorporated into the threaded connection or be a surface of the threaded connection.

The threaded connection 152 is threaded through a compensator 160. Compensator 160 is a flexible and/or pliable element and provides resistance to movement of the threaded connection, including inadvertent movement. An example of a suitable material for the compensator 160 is nylon. The compensator 160 has a threaded center opening 162 to receive the threaded connection 152. During assembly, the compensator is backed off from base 154 to provide a space. Note that when backing off, the compensator 160 can rotate on threaded connection 152. To accommodate various degrees of rotation and therefore different sizes of spacing from the base 154, multiple holes 164 toward the periphery of the compensator 160 are included. These holes 164 can accommodate the mounting device for the adjustment assembly 20, such as a bolt 156. When the adjustment assembly 20 is mounted to the housing body 18, the space between compensator 160 and base 154 at the periphery is closed, but the space in the region of the threaded center opening 162 remains. The resulting deformation of the compensator 160 produces a force on the threaded connection 152 in resistance to rotation. The amount of deformation, and therefore the amount of force in resistance to rotation, is greater or smaller in direct proportion to the amount of space provided during the backing-off of the compensator 160 from the base 154.

The force in resistance to rotation provided by the deformation of the compensator 160 is in the same direction as the force applied by the translating bar 104 contacting the contact face 144 of the adjustment assembly 20. Thus, a zero or near zero backlash exists when actuating the translating bar 104 and the actuation of the flexibly mounted cartridges 12 is highly repeatable and the adjustments made by the adjustment assembly 20 are highly precise. Both of these attributes contribute to improved and accurate positioning of the inserts 16 mounted on the flexibly mounted cartridges 12 when in the radially extended position—material removal tools using the disclosed features have been actuated in excess of 5,000 times to a repeatability of radial position of within 1 μm.

Figure 11:
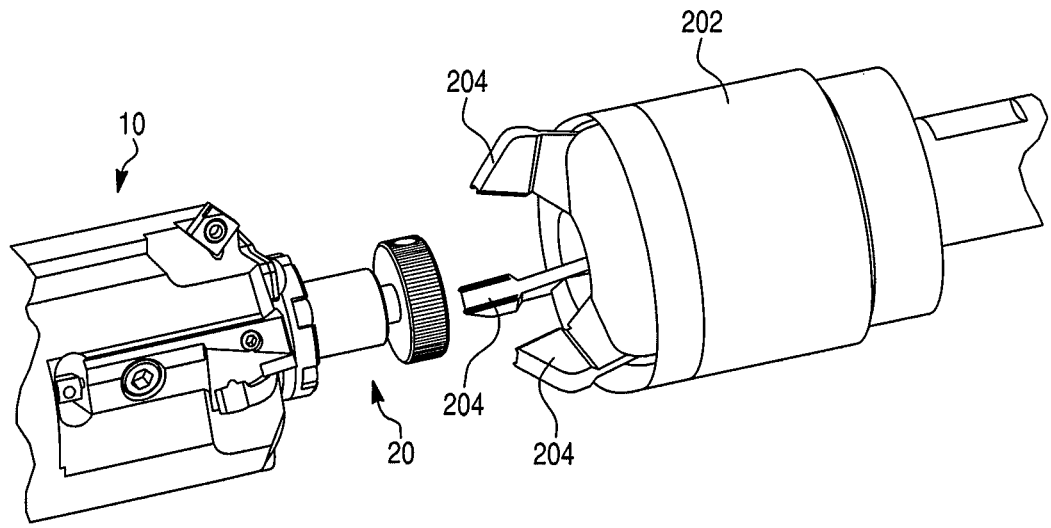
FIGS. 11 and 12 schematically illustrate manipulation of the exemplary embodiment of the adjustment assembly shown in FIGS. 9 and 10.
Figure 12:
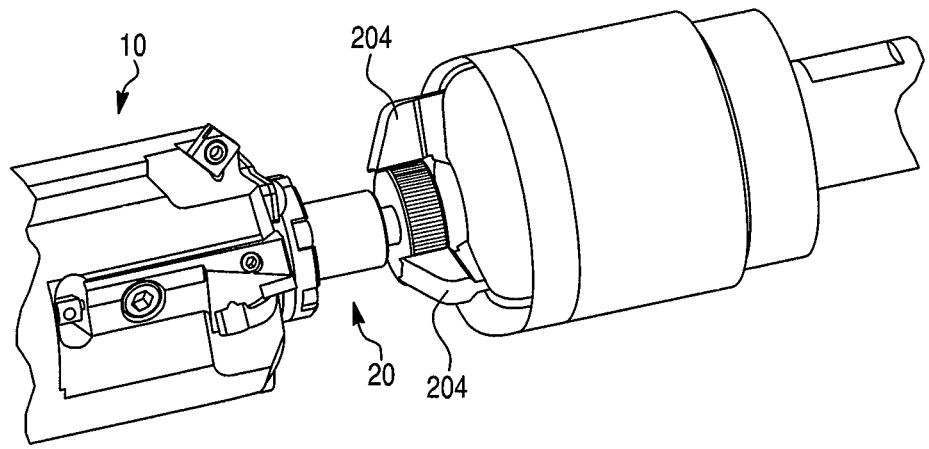

FIGS. 11 and 12 schematically illustrate manipulation of the exemplary embodiment of the adjustment assembly 20 shown in FIGS. 9 and 10. A manipulator coupling 202 includes grasping elements 204. The manipulator coupling 202 is mounted within a reachable position of the material removal tool 10. The machine tool can move the material removal 10 to place the manipulating point of the adjustment assembly 20 into the grasping elements 204, which then close. The grasping elements 204 hold the manipulating point stationary while the machine tool operates to rotate the material removal tool 10 a precise number of degrees to produce a resulting translation of the contact face 144 of the adjustment assembly 20. The translation can be an initial positioning or subsequent repositioning of the delimiting structure, e.g., the contact face 144. Other adjustable delimiting structures can be manipulated by similar systems or any other suitable system.

Various methods can be used to remove material from a workpiece with the material removal tools disclosed herein. For example, on insertion or on a first contact with a workpiece by the material removal tool, a cutting insert mounted as a first flexibly mounted cutting insert, a cutting insert mounted as a fixedly mounted cutting insert or a cutting insert mounted as a second fixedly mounted cutting insert can operate to remove material from the workpiece. The material removal tool can then be removed without any further removal of material or, alternatively, can be actuated to place a different cutting insert selected from the first flexibly mounted cutting insert, the cutting insert mounted as a fixedly mounted cutting insert or the cutting insert mounted as a second fixedly mounted cutting insert in a position to remove material from the workpiece upon extraction or second contact. In the instance where the material removal tool is removed without any further removal of material, the material removal tool can be actuated away from the workpiece to place a different cutting insert selected from the first flexibly mounted cutting insert, the cutting insert mounted as a fixedly mounted cutting insert or the cutting insert mounted as a second fixedly mounted cutting insert in a position to remove material from the workpiece upon subsequent insertion or second contact. These various methods can use any combination of flexibly mounted cutting inserts with (a) fixedly mounted cutting inserts or (b) other flexibly mounted cutting inserts. A few non-limiting examples are provided herein.

An exemplary method for removing material from a workpiece with a rotating material removal tool to form a bore comprises translating the rotating material removal tool in a first direction while contacting the workpiece with a first fixedly mounted cutting insert. Here, a diameter at an outermost surface of the first fixedly mounted cutting insert defines a first active volume. The material removal tool is actuated to move a portion of a second cutting insert mounted in a seating pocket of a first flexibly mounted cartridge of the material removal tool radially outward of the first active volume. In an exemplary embodiment, actuating the material removal tool axially translates a translating bar from a first position to a second position. The rotating material removal tool is then translated in a second direction while contacting the workpiece with the second cutting insert. In exemplary embodiments, the first direction is inserting the material removal tool into the bore and the second direction is extracting the material removal tool from the bore.

Another exemplary method for removing material from a workpiece with a rotating material removal tool to form a bore comprises actuating the material removal tool to move a portion of a first flexibly mounted cutting insert of a first flexibly mounted cartridge of the material removal tool radially outward of an active volume of the material removal tool. The rotating material removal tool is translated in a first direction while contacting the workpiece with the first flexibly mounted cutting insert and while contacting the workpiece with a first fixedly mounted cutting insert of the material removal tool. The first fixedly mounted cutting insert is positioned axially forward in the first direction from the first flexibly mounted cutting insert and a diameter at an outermost surface of the first fixedly mounted cutting insert defines the first active volume. This typically results in the axially forward first fixedly mounted cutting insert removing material first to a first depth followed by the first flexibly mounted cutting insert of the first flexibly mounted cartridge removing material second to a second depth, the second depth being deeper than the first depth. Thus, the axially forward first fixedly mounted cutting insert can be a roughing insert and the first flexibly mounted cutting insert of the first flexibly mounted cartridge can be a finishing insert.

After translation in the first direction, the material removal tool is actuated to move the first flexibly mounted cutting insert radially inward from the first active volume. The rotating material removal tool is then translated in a second direction, and neither the first fixedly mounted cutting insert nor the first flexibly mounted cutting insert is contacting the workpiece, which has a finished surface and is free from any extraction marks.

Another exemplary method for removing material from a workpiece with a rotating material removal tool to form a bore comprises translating the rotating material removal tool in a first direction while contacting the workpiece with a first fixedly mounted cutting insert of the material removal tool. A diameter at an outermost surface of the first fixedly mounted cutting insert defines a first active volume. The rotating material removal tool is then translated in a second direction. Generally, the material removal tool is removed from the area of the workpiece by the translation in the second direction. The material removal tool is then actuated to move a portion of a first flexibly mounted cutting insert of a flexibly mounted cartridge radially outward of the first active volume. The rotating material removal tool is then translated in the first direction while contacting the workpiece with the first flexibly mounted cutting insert, after which the material removal tool is actuated to move the first flexibly mounted cutting insert radially inward of the first active volume and the rotating material removal tool is translated in the second direction. Generally, the material removal tool is removed from the area of the workpiece by the translation in the second direction.

A further method for removing material from a workpiece with a rotating material removal tool to form a bore comprises actuating the material removal tool to move a portion of a first flexibly mounted cutting insert of a first flexibly mounted cartridge radially outward of a first flexibly mounted cutting insert of a second flexibly mounted cartridge. The rotating material removal tool is then translated in a first direction while contacting the workpiece with the first fixedly mounted cutting insert, after which the material removal tool is actuated to move a portion of the second flexibly mounted cutting insert of the second flexibly mounted cartridge radially outward of the first flexibly mounted cutting insert of the first flexibly mounted cartridge and the rotating material removal tool is translated in a second direction.

In some exemplary methods, a finished surface of the workpiece is formed in one insertion or one contact cycle of the material removal tool; in other exemplary embodiments, a finished surface of the workpiece is formed in one insertion and extraction cycle or one contact and removal cycle of the material removal tool; in still other exemplary embodiments, a finished surface of the workpiece is formed in more than one insertion and extraction cycle or more than one contact and removal cycle of the material removal tool. In some embodiments, the finished surface is free from any extraction marks, including being free from indentations or scratches.

Figure 13:
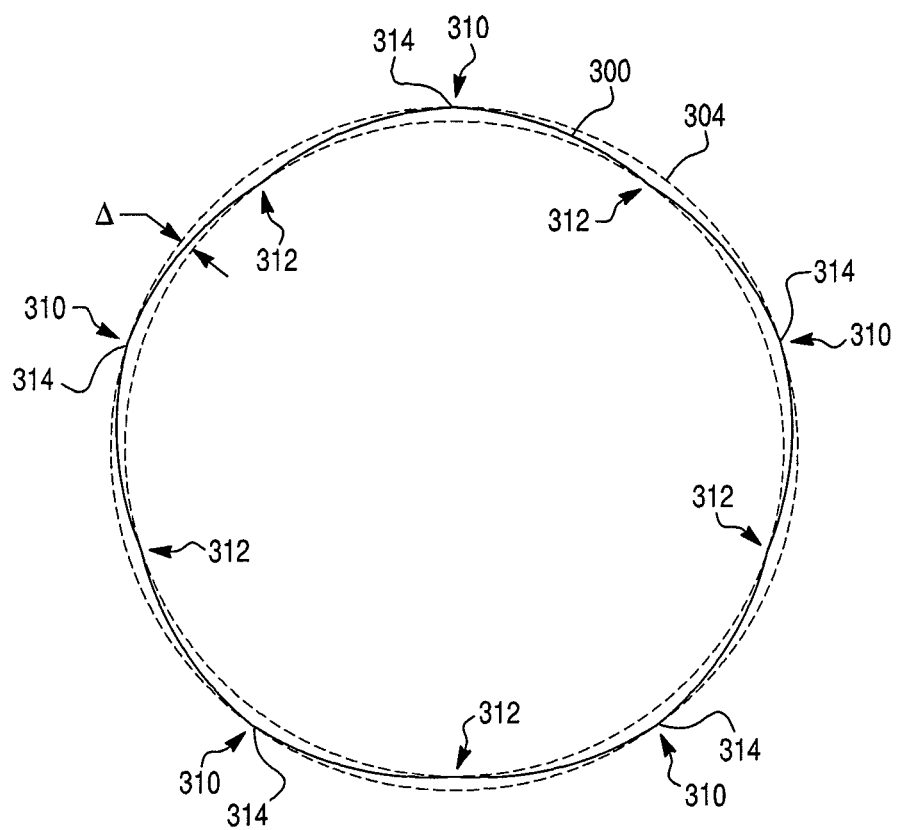
FIG. 13 shows in cross-sectional view the inner diameter surface formed by an exemplary embodiment of the material removal tool.

Inspection of surfaces formed by the material removal tools disclosed herein have been conducted. FIG. 13 shows in cross-sectional view the inner diameter surface formed by an exemplary embodiment of the material removal tool. The figure was taken during an inspection using a coordinate measuring machine after machining a bore in a bimetallic workpiece with a material removal tool with five flexible cartridges. As shown in FIG. 13, the inner diameter surface 300 is substantially circular, being completely contained within the imaginary cylinder formed by a first limiting circumference 302 and a second limiting circumference 304, the first limiting circumference 302 and the second limiting circumference 304 being separated by a distance ($\Delta$) on the order of microns, alternatively less than 3 microns, alternatively less than about 1.5 microns. It should be noted that such variation of the inner diameter surface is within the tolerances of applications using boring tools and is equal to or less than current variations of these surfaces.

In FIG. 13, the substantially circular inner diameter surface 300 is varying within the separation distance $\Delta$ in a regular or patterned fashion. Namely, inner diameter surface 300 has positive lobes 310 that extend towards the first limiting circumference 302 each separated by a negative lobe 312 that extends toward the second limiting circumference 304, relative to a nominal center circumference (not shown) between the first limiting circumference 302 and the second limiting circumference 304. In one aspect, the circular inner diameter surface 300 varies in a pattern where the number of positive lobes 310 is a multiple of the number of flexibly mounted cartridges. In FIG. 13, there are five positive lobes 310, each positive lobe 310 is centered at points 314 that approximately coincide with the points of a five-pointed star. Of course, different number of positive lobes and different geometric arrangements of those positive lobes can be achieved by varying the number of flexibly mounted cartridges.

Although the noted variation of the inner diameter surface is within the tolerances of applications using boring tools and, in some instances, is less than current variations of these surfaces, one may mitigate or reduce the noted variation by modifying the translating bar of the material removal tool to include a support. For example, the translating bar of the material removal tool can be modified to include a support at the second end located between an axial midpoint of the translating bar and the distal end of the translating bar, either axially before or axially after the actuating surface, e.g., at an axially center-side of the actuating surface or at an axially distal-side of the actuating surface, or a combination of both. The support mitigates or eliminates flexing of the translating bar in response to push-back during machining with the inserts located on the actuated flexible cartridges.

Figure 14:
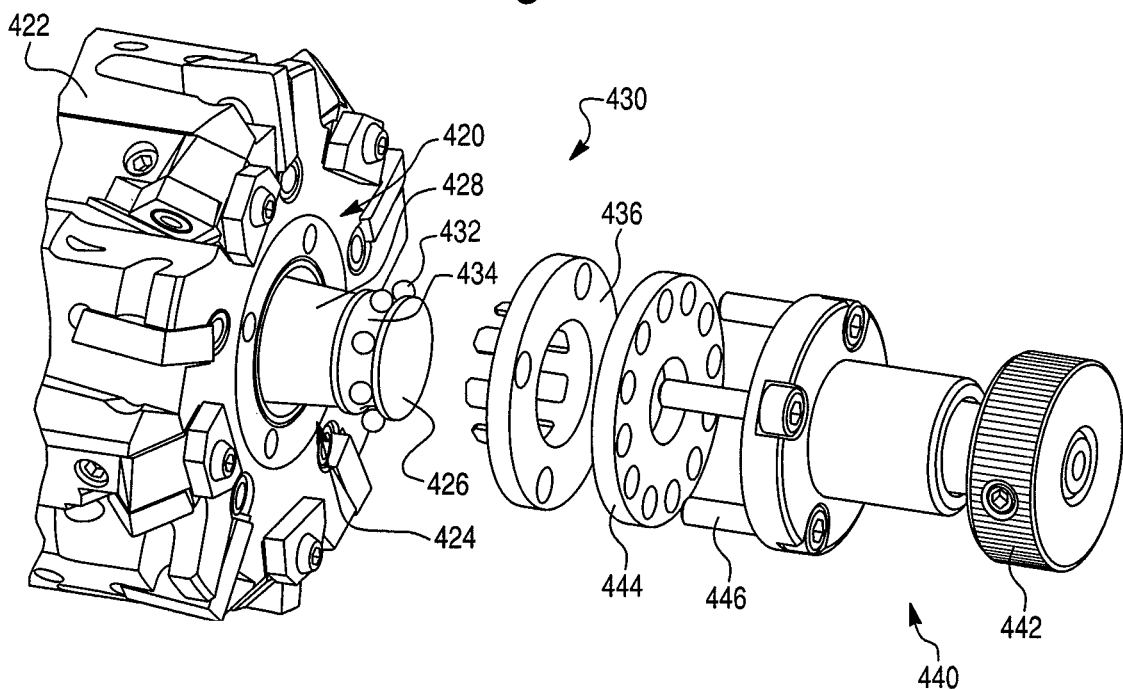
FIG. 14 shows an exemplary embodiment of a support at the second end of the translating bar.

FIG. 14 shows an exemplary embodiment of a support at the second end of the translating bar. In the expanded view of FIG. 14, a second end 420 of a material removal tool 422 is shown with a translating bar 424 extending therefrom. Both the second end 426 of the translating bar 424 and the actuating surface 428 are visible in the view in FIG. 14. In the depicted exemplary embodiment, the support 430 includes a plurality of bearings 432 distributed between an inner ring 434 and a separation mechanism 436. The bearings 432 may be of any suitable type, including ball bearing, roller bearings, tapered roller bearings, needle bearings, or spherical roller bearings. The inner ring can be integral with the translating bar or can be a separate structure attached to the translating bar. Further a support 430 including bearings 432 can incorporate suitable mechanisms to separate the bearings 432, such as a cage, and/or can use an outer ring. When present, the separation mechanism, cage and/or outer ring can be separate components or can be of unitary construction.

Figure 15:
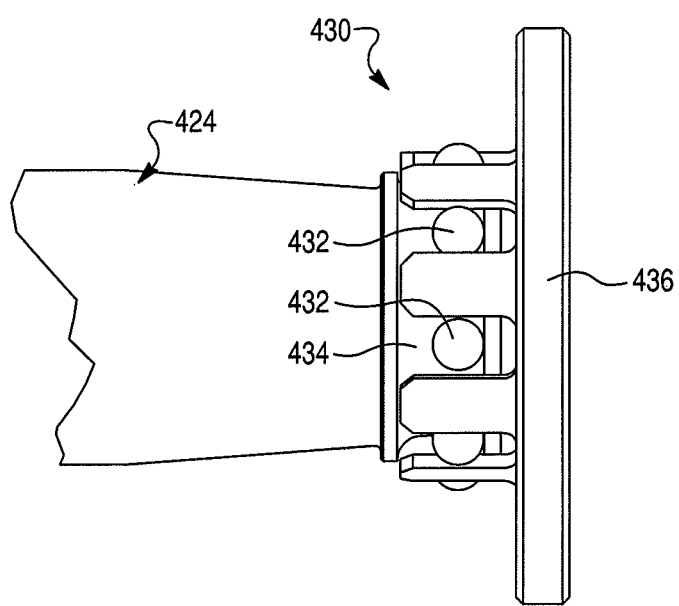
FIG. 15 shows an assembled view of the exemplary embodiment of the support depicted in FIG. 14.

FIG. 15 shows an assembled view of the exemplary embodiment of the support depicted in FIG. 14. In FIG. 15, the exemplary arrangement of the translating bar 424, the separation mechanism 436 is positioned onto the translating bar 424 with an interference fit and separates and retains the bearings 432 located in the inner ring 434.

FIG. 14 includes an adjustment assembly 440 at the second end 420 of the material removal tool 422. The adjustment assembly 440 can be substantially as shown and described herein, e.g., in connection with FIGS. 1-2, 3B, 5A, 5B, 6-7 and 9-12, and includes, for example, a contact face (not visible in FIG. 14), a knurled knob 442, a compensator 444 and a mounting device for the adjustment assembly 440, such as a bolt 446. Although described here as an adjustment assembly, any suitable second delimiting structure can be used, as previously noted herein.

Exemplary embodiments of a support 430 can be incorporated into any of the embodiments the material removal tool shown and described herein, including, for example, the material removal tool shown and described in connection with FIGS. 1 and 2.

An exemplary method to reduce variation in radial position of an inner diameter surface of a bore formed with a material removal tool comprises positioning a support structure at a second end of the translating bar. In an exemplary embodiment, the support includes a plurality of bearings distributed between an inner ring and a separation mechanism. An example of a support structure is the support structure disclosed and described herein in connection with FIGS. 14 and 15.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A material removal tool, comprising:
    a housing body including a connector at a mating end;
    a piston head in an actuating chamber internal to the housing body;
    a translating bar including an actuation surface;
    a first flexibly mounted cartridge on an active portion of the material removal tool, the first flexibly mounted cartridge including at least one seating pocket for a cutting insert; and
    a first delimiting structure and a second delimiting structure, wherein the second delimiting structure is an adjustable positive stop, wherein the adjustable positive stop limits axial movement of the translating bar in a first direction,
    wherein the translating bar includes a first end operably connected to the piston head to axially translate between a first position and a second position when the piston head translates,
    wherein in the first position, the active portion has a first active volume and a radially outermost surface of a cutting insert seated in the seating pocket on the first flexibly mounted cartridge is radially inward from the first active volume,
    wherein in the second position, the radially outermost surface of the cutting insert seated in the pocket on the first flexibly mounted cartridge is radially outward from the first active volume, and
    wherein the actuation surface includes a cone or frustum, wherein an axial position of the cone or frustum along a length of the translating bar corresponds to a position of a push rod in operable contact with the first flexibly mounted cartridge.

2. The material removal tool of claim 1, wherein the material removal tool includes at least one fixed mounting location for a fixedly mounted cutting insert, wherein the first active volume is determined based on a radially outermost surface of the fixedly mounted cutting insert.

3. The material removal tool of claim 2, wherein the at least one fixed mounting location is a seating surface on a fixedly mounted cartridge.

4. The material removal tool of claim 2, wherein the at least one fixed mounting location is a seating surface directly on the housing body.

5. The material removal tool of claim 1, comprising a second flexibly mounted cartridge on the active portion of the material removal tool, the second flexibly mounted cartridge including at least one seating pocket for a second cutting insert, wherein the first active volume is determined based on a radially outermost surface of the second cutting insert seated on the second flexibly mounted cartridge.

6. The material removal tool of claim 1, comprising at least two flexibly mounted cartridges,
    wherein the at least two flexibly mounted cartridges have associated push rods, wherein the at least two flexibly mounted cartridges generate a force pushing the associated push rod radially inward, and
    wherein the generated forces are balanced to center the translating bar in the material removal tool.

7. The material removal tool of claim 6, wherein an outer surface of the cone or frustum makes, in a radial cross-sectional view, a line contact with more than one push rod, each of the push rods associated with a different one of the plurality of flexibly mounted cartridges.

8. The material removal tool of claim 7, wherein at least the outer surface of the cone or frustum in line contact with the push rod is polished.

9. The material removal tool of claim 1, wherein the actuation surface has a peripheral surface that is continuous.

10. The material removal tool of claim 1, wherein the actuation surface has a peripheral surface that is non-continuous.

11. The material removal tool of claim 10, wherein a peripheral extent of the peripheral surface is from about 120 to less than 360 as viewed in radial cross-section.

12. The material removal tool of claim 1, including a support at a second end of the translating bar.

13. The material removal tool of claim 12, wherein the support includes a plurality of bearings distributed between an inner ring and a separation mechanism.

14. A method for removing material from a workpiece with a rotating material removal tool to form a bore, the method comprising:
    translating the rotating material removal tool in a first direction while contacting the workpiece with a first fixedly mounted cutting insert, wherein a diameter at an outermost surface of the first fixedly mounted cutting insert defines a first active volume;
    actuating the material removal tool to move a portion of a second cutting insert mounted in a seating pocket of a first flexibly mounted cartridge of the material removal tool radially outward of the first active volume; and
    translating the rotating material removal tool in a second direction while contacting the workpiece with the second cutting insert,
    wherein actuating the material removal tool axially translates a translating bar from a first position to a second position,
    wherein the translating bar includes an actuation surface,
    wherein the actuation surface includes a cone or frustum, wherein an axial position of the cone or frustum along a length of the translating bar corresponds to a position of a push rod in operable contact with the first flexibly mounted cartridge, and
    wherein the material removal tool includes a first delimiting structure and a second delimiting structure, wherein the second delimiting structure is an adjustable positive stop, wherein the adjustable positive stop limits axial movement of the translating bar in a first direction.

15. The method of claim 14, wherein the first direction is inserting the material removal tool into the bore and wherein the second direction is extracting the material removal tool from the bore.

16. The method of claim 15, wherein the method forms a finished surface of the bore in one insertion-extraction cycle of the material removal tool.

17. The method of claim 14, the method further comprising including a support at a second end of the translating bar.

18. The method of claim 17, wherein the support includes a plurality of bearings distributed between an inner ring and a separation mechanism.

19. A method for removing material from a workpiece with a rotating material removal tool to form a bore, the method comprising:
- actuating the material removal tool to move a portion of a first flexibly mounted cutting insert of a first flexibly mounted cartridge of the material removal tool radially outward of an active volume of the material removal tool;
- translating the rotating material removal tool in a first direction while contacting the workpiece with the first flexibly mounted cutting insert and while contacting the workpiece with a first fixedly mounted cutting insert of the material removal tool, wherein the first fixedly mounted cutting insert is positioned axially forward in the first direction from the first flexibly mounted cutting insert and wherein a diameter at an outermost surface of the first fixedly mounted cutting insert defines the first active volume;
- actuating the material removal tool to move the first flexibly mounted cutting insert radially inward from the first active volume; and
- translating the rotating material removal tool in a second direction, wherein actuating the material removal tool axially translates a translating bar from a first position to a second position,
- wherein the translating bar includes an actuation surface,
- wherein the actuation surface includes a cone or frustum, wherein an axial position of the cone or frustum along a length of the translating bar corresponds to a position of a push rod in operable contact with the first flexibly mounted cartridge, and
- wherein the rotating material removal tool includes a first delimiting structure and a second delimiting structure, wherein the second delimiting structure is an adjustable positive stop wherein the adjustable positive stop limits axial movement of the translating bar in a first direction.

20. The method of claim 19, wherein the first direction is inserting the material removal tool into the bore and wherein the second direction is extracting the material removal tool from the bore.

21. The method of claim 20, wherein the method forms a finished surface of the bore in one insertion cycle of the material removal tool.

22. The method of claim 21, wherein the finished surface is free from any extraction marks.

23. The method of claim 19, the method further comprising including a support at a second end of the translating bar.

24. The method of claim 23, wherein the support includes a plurality of bearings distributed between an inner ring and a separation mechanism.

25. A method for removing material from a workpiece with a rotating material removal tool to form a bore, the method comprising:
- translating the rotating material removal tool in a first direction while contacting the workpiece with a first fixedly mounted cutting insert of the material removal tool, wherein a diameter at an outermost surface of the first fixedly mounted cutting insert defines a first active volume;
- translating the rotating material removal tool in a second direction;
- actuating the material removal tool to move a portion of a first flexibly mounted cutting insert of a flexibly mounted cartridge radially outward of the first active volume;
- translating the rotating material removal tool in the first direction while contacting the workpiece with the first flexibly mounted cutting insert;
- actuating the material removal tool to move the first flexibly mounted cutting insert radially inward of the first active volume; and
- translating the rotating material removal tool in the second direction,
- wherein actuating the material removal tool axially translates a translating bar from a first position to a second position,
- wherein the translating bar includes an actuation surface, and
- wherein the actuation surface includes a cone or frustum, wherein an axial position of the cone or frustum along a length of the translating bar corresponds to a position of a push rod in operable contact with the first flexibly mounted cartridge.

26. The method of claim 25, wherein the first direction is inserting the material removal tool into the bore and wherein the second direction is extracting the material removal tool from the bore.

27. The method of claim 26, wherein the method forms a finished surface of the bore in two insertion-extraction cycles of the material removal tool.

28. The method of claim 27, wherein the finished surface is free from any extraction marks.

29. The method of claim 25, the method further comprising including a support at a second end of the translating bar.

30. The method of claim 29, wherein the support includes a plurality of bearings distributed between an inner ring and a separation mechanism.

31. A method for removing material from a workpiece with a rotating material removal tool to form a bore, the method comprising:
- actuating the material removal tool to move a portion of a first flexibly mounted cutting insert of a first flexibly mounted cartridge radially outward of a second flexibly mounted cutting insert of a second flexibly mounted cartridge;
- translating the rotating material removal tool in a first direction while contacting the workpiece with the first flexibly mounted cutting insert;
- actuating the material removal tool to move a portion of the second flexibly mounted cutting insert of the second flexibly mounted cartridge radially outward of the first flexibly mounted cutting insert of the first flexibly mounted cartridge; and
- translating the rotating material removal tool in a second direction,
- wherein actuating the material removal tool axially translates a translating bar from a first position to a second position,
- wherein the translating bar includes an actuation surface, and
- wherein the actuation surface includes a cone or frustum, wherein an axial position of the cone or frustum along a length of the translating bar corresponds to a position of a push rod in operable contact with the first flexibly mounted cartridge.

32. The method of claim 31, wherein the first direction is inserting the material removal tool into the bore and wherein the second direction is extracting the material removal tool from the bore.

33. The method of claim 32, wherein the method forms a finished surface of the bore in one insertion-extraction cycle of the material removal tool.

34. The method of claim 33, wherein the finished surface is free from any extraction marks.

35. The method of claim 31, including a support at a second end of the translating bar.

36. The method of claim 35, wherein the support includes a plurality of bearings distributed between an inner ring and a separation mechanism.

37. A method to reduce variation in radial position of an inner diameter surface of a bore formed with a material removal tool, the material removal tool including a translating bar including an actuation surface, a first flexibly mounted cartridge on an active portion of the material removal tool, the first flexibly mounted cartridge including at least one seating pocket for a cutting insert, and a first delimiting structure and a second delimiting structure, wherein the second delimiting structure is an adjustable positive stop, wherein the adjustable positive stop limits axial movement of the translating bar in a first direction, wherein the translating bar axially translates between a first position and a second position, wherein in the first position, the active portion has a first active volume and a radially outermost surface of a cutting insert seated in the seating pocket on the first flexibly mounted cartridge is radially inward from the first active volume, wherein in the second position, the radially outermost surface of the cutting insert seated in the pocket on the first flexibly mounted cartridge is radially outward from the first active volume, and wherein the actuation surface includes a cone or frustum, wherein an axial position of the cone or frustum along a length of the translating bar corresponds to a position of a push rod in operable contact with the first flexibly mounted cartridge, the method comprising:
positioning a support structure at an end of the translating bar.

38. The method of claim 37, wherein the support structure includes a plurality of bearings distributed between an inner ring and a separation mechanism.

39. A material removal tool, comprising:
a housing body including a connector at a mating end;
a piston head in an actuating chamber internal to the housing body;
a translating bar including an actuation surface; and
a first flexibly mounted cartridge on an active portion of the material removal tool, the first flexibly mounted cartridge including at least one seating pocket for a cutting insert,
wherein the translating bar includes a first end operably connected to the piston head to axially translate between a first position and a second position when the piston head translates,
wherein in the first position, the active portion has a first active volume and a radially outermost surface of a cutting insert seated in the seating pocket on the first flexibly mounted cartridge is radially inward from the first active volume,
wherein in the second position, the radially outermost surface of the cutting insert seated in the pocket on the first flexibly mounted cartridge is radially outward from the first active volume,
wherein the actuation surface includes a cone or frustum, wherein an axial position of the cone or frustum along a length of the translating bar corresponds to a position of a push rod in operable contact with the first flexibly mounted cartridge, and
wherein the push rod directly contacts the actuation surface, the push rod making line contact with the actuation surface in a radial cross-section view.

40. A material removal tool, comprising:
a housing body including a connector at a mating end;
a piston head in an actuating chamber internal to the housing body;
a translating bar including an actuation surface; and
a first flexibly mounted cartridge on an active portion of the material removal tool, the first flexibly mounted cartridge including at least one seating pocket for a cutting insert,
a second flexibly mounted cartridge on the active portion of the material removal tool, the second flexibly mounted cartridge including at least one seating pocket for a second cutting insert,
wherein the translating bar includes a first end operably connected to the piston head to axially translate between a first position and a second position when the piston head translates,
wherein in the first position, the active portion has a first active volume and a radially outermost surface of a cutting insert seated in the seating pocket on the first flexibly mounted cartridge is radially inward from the first active volume,
wherein in the second position, the radially outermost surface of the cutting insert seated in the pocket on the first flexibly mounted cartridge is radially outward from the first active volume,
wherein the actuation surface includes a cone or frustum, wherein an axial position of the cone or frustum along a length of the translating bar corresponds to a position of a push rod in operable contact with the first flexibly mounted cartridge, and
wherein the first active volume is determined based on a radially outermost surface of the second cutting insert seated on the second flexibly mounted cartridge.

41. A material removal tool, comprising:
a housing body including a connector at a mating end;
a piston head in an actuating chamber internal to the housing body;
a translating bar including an actuation surface; and
a first flexibly mounted cartridge on an active portion of the material removal tool, the first flexibly mounted cartridge including at least one seating pocket for a cutting insert,
wherein the translating bar includes a first end operably connected to the piston head to axially translate between a first position and a second position when the piston head translates,
wherein in the first position, the active portion has a first active volume and a radially outermost surface of a cutting insert seated in the seating pocket on the first flexibly mounted cartridge is radially inward from the first active volume, wherein in the second position, the radially outermost surface of the cutting insert seated in the pocket on the first flexibly mounted cartridge is radially outward from the first active volume, wherein the actuation surface includes a cone or frustum, wherein an axial position of the cone or frustum along a length of the translating bar corresponds to a position of a push rod in operable contact with the first flexibly mounted cartridge, and wherein the actuation surface has a peripheral surface that is non-continuous.

* * * * *